US008266369B2

(12) United States Patent
MacKenna et al.

(10) Patent No.: US 8,266,369 B2
(45) Date of Patent: Sep. 11, 2012

(54) FLASH MEMORY INTERFACE

(75) Inventors: Craig MacKenna, Los Gatos, CA (US);
Prithvi Nagaraj, Sunnyvale, CA (US);
Rob Cosaro, San Jose, CA (US)

(73) Assignee: NXP B.V., Eindhoven (NL)

( * ) Notice: Subject to any disclaimer, the term of this patent is extended or adjusted under 35 U.S.C. 154(b) by 482 days.

(21) Appl. No.: 12/642,133

(22) Filed: Dec. 18, 2009

(65) Prior Publication Data

US 2011/0153910 A1    Jun. 23, 2011

(51) Int. Cl.
*G06F 12/00* (2006.01)
*G06F 13/16* (2006.01)
*G06F 13/40* (2006.01)
*G06F 13/42* (2006.01)

(52) U.S. Cl. .......... 711/103; 711/E12.001; 711/E12.008

(58) Field of Classification Search .................. None
See application file for complete search history.

(56) References Cited

U.S. PATENT DOCUMENTS

| 5,630,093 | A  | * | 5/1997 | Holzhammer et al. | ........ | 711/115 |
| 5,802,554 | A  | * | 9/1998 | Caceres et al. | ................ | 711/103 |
| 6,115,799 | A  | * | 9/2000 | Ogawa | ........................ | 711/171 |
| 6,470,413 | B1 | * | 10/2002 | Ogawa | ........................ | 711/103 |
| 6,772,421 | B2 | * | 8/2004 | Ogawa | ........................ | 719/331 |
| 7,290,095 | B2 | * | 10/2007 | Ogawa | ........................ | 711/154 |
| 8,060,453 | B2 | * | 11/2011 | Tolmie et al. | ................. | 705/401 |
| 2010/0030947 | A1 | * | 2/2010 | Moon et al. | ................... | 711/103 |

\* cited by examiner

*Primary Examiner* — Kevin Verbrugge

(57) ABSTRACT

Flash-type memory access and control is facilitated (e.g., as random-access memory). According to an example embodiment, an interface communicates with and controls a flash memory circuit over a peripheral interface bus. The interface uses a FIFO buffer coupled to receive data from and store data for the flash memory circuit and to provide access to the stored data. An interface controller communicates with the flash memory circuit via the peripheral interface bus to initialize the flash memory circuit and to access data thereto, in response to requests from a processor. In some applications, the flash memory circuit is initialized by sending commands to it. The interface may be placed into a read-only mode in which data in the flash memory is accessed as part of main (computer) processor memory, using the FIFO to buffer data from the flash.

19 Claims, 8 Drawing Sheets

FLASH MEMORY INTERFACE

FIELD OF THE INVENTION

The present invention relates generally to memory devices, and more specifically to a memory device having a flash-type interface.

BACKGROUND

Flash memory is a non-volatile type of erasable and rewritable memory, which has experienced a good deal of success due to its relatively inexpensive nature. In many instances, flash memory is erased and programmed in large blocks. Implementations of flash memory have included external memory such as memory cards and flash drives, as well as internal memory, such as solid state storage for hand-held or mobile devices.

Flash memory devices are operated in a variety of manners. In many applications, a command mode is used for operations such as erasing and programming, and a memory mode is used for reading data from the flash. In some applications, flash devices use a half-duplex command-driven serial peripheral interface (SPI) protocol for device setup/initialization, and then move to a half-duplex command-driven 4-bit protocol for normal operation. However, different flash devices accept and/or require different commands and command formats. In many cases, flash devices are not compatible with certain types of other devices or processors. In addition, many forms of flash memory are not amenable to rapid access as required or desirable in certain applications.

These and other issues continue to present challenges to the utilization of serial flash memory.

SUMMARY

The present invention is exemplified in a number of implementations and applications, some of which are summarized below.

Consistent with an example embodiment of the present invention, a peripheral interface circuit interfaces between a computer processor and a flash memory circuit that is communicatively connected to the interface by a peripheral interface bus, in order to store and provide access to data that is stored on the flash memory circuit, which is mapped as a portion of main processor memory. The interface circuit includes a first-in, first-out (FIFO) buffer and an interface controller. The FIFO buffer is coupled to receive and store data from the flash memory circuit and to provide data buffering. The interface controller is configured to communicate with the flash memory circuit via the peripheral interface bus, initialize the flash memory circuit for providing data to the FIFO buffer as a portion of the main memory, and provide data from the flash in response to requests for access to addresses mapped as a portion of main memory. In response to a request for the data mapped as a portion of main memory and having at least a portion thereof stored in the FIFO buffer, the controller controls the FIFO buffer to provide access to the stored data and (if necessary) controls the flash memory circuit to provide the balance of the requested data from subsequent addresses in the flash memory circuit to the FIFO buffer. In response to a request for the data mapped as a portion of main memory and not stored in the FIFO buffer, the controller controls the flash memory circuit to provide the requested data to the FIFO buffer. In either case, the controller reads the contents of subsequent addresses and stores them in the FIFO buffer.

Another example embodiment is directed to a flash memory-interface system for storing and providing access to data mapped as a portion of main memory of a computer. The system includes a peripheral interface bus, a flash memory circuit, a FIFO buffer and an interface circuit. The flash memory circuit is configured to connect to and communicate via the peripheral interface bus and to store the data mapped as a portion of main memory. The FIFO buffer and interface circuit generally operate as described above, in connection with the peripheral interface circuit.

Other example embodiments are directed to methods of controlling interface and/or memory circuits in accordance with one or more approaches as discussed herein.

The above summary is not intended to describe each embodiment or every implementation of the present disclosure. The figures and detailed description that follow more particularly exemplify various embodiments.

BRIEF DESCRIPTION OF THE DRAWINGS

The invention may be more completely understood in consideration of the following detailed description of various embodiments of the invention in connection with the accompanying drawings, in which.

Figure 1:
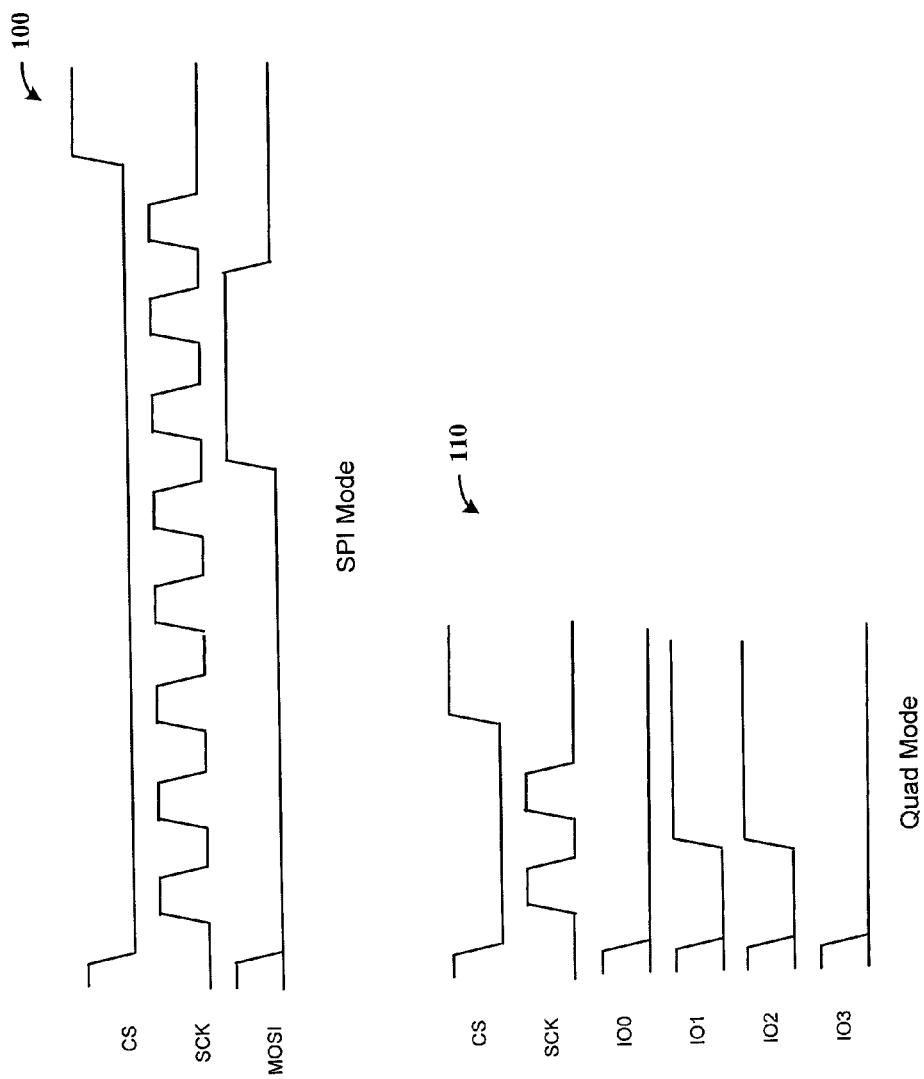
FIG. 1 shows a plot of signals for operating a flash memory circuit in SPI and quad modes, in accordance with one or more example embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

DETAILED DESCRIPTION

The present invention is believed to be applicable to a variety of different types of processes, devices and arrangements for use with computer memory applications. While the present invention is not necessarily so limited, various aspects of the invention may be appreciated through a discussion of examples using this context.

In connection with various example embodiments, a flash memory interface is configured to interact between a computer processor (CPU), optionally a memory controller thereof; and a flash memory circuit, for writing data to and reading data from the flash memory circuit. The flash memory interface includes a communication port for communicating with the flash memory circuit, a first-in, first-out (FIFO) type buffer to store data transferred to and from the flash memory circuit, and a controller configured to control the writing of data to and the reading of data from the flash memory circuit, in response to the CPU or memory controller.

The flash memory interface is configured to interact with one or more types of flash memory circuits, and provides a consistent interface across all such flash memory circuits for access by one or more of a variety of types of CPUs and/or peripheral devices. The flash memory interface is responsive to read and write commands from the CPU by interacting with a flash memory circuit via the communications port. Communications are in accordance with serial and 4-bit bidirectional protocols. For instance, a half-duplex command-driven serial peripheral interface (SPI) protocol can be used for device setup/initialization, followed by the use of a half-duplex command-driven 4-bit protocol for normal operation. Operations with the bus master may include byte, halfword, and word accesses.

The flash memory circuits respond to software-driven commands (e.g., from a computer processor accessing the flash) and/or commands automatically sent by the flash memory interface when the flash region of the memory map is read. In some instances, commands are divided into fields including opcode, address, intermediate data, and data. The address, intermediate data, and data fields are optional depending on the opcode. In some implementations, the opcode is implied in read commands for higher performance. Data fields can be divided into input and output data fields depending on the opcode.

In one particular implementation, the flash memory interface operates in a master mode under half-duplex communications with a flash memory slave. During initial setup, the flash memory interface is initialized such that thereafter, the flash memory effectively inhabits a portion of memory space of the CPU (e.g., as a portion of memory space of a processor such as a RISC-type (e.g., from ARM Holdings of San Jose, Calif.), acting in a manner similar to an External Memory Interface or SDRAM controller).

When erasing or programming is needed, the flash memory interface operates in a peripheral mode, in which registers in the interface are written (e.g., via software or firmware) with a proper sequence of values to accomplish the programming. During erasure or programming, the flash address block is not read.

The flash memory interface provides a flash address block for the flash memory circuit (or circuits) coupled thereto, for reading by the CPU as inhabiting a portion of its memory space (e.g., as a portion of ARM memory space as discussed above). In some implementations, the CPU accesses the flash address block via sequential or random load instructions, and either processes the data directly or copies the data to random-access memory (RAM). In other implementations, a DMA controller sequentially reads data from the flash memory circuit(s) independently of the CPU, and copies the data to RAM or outputs the data to a peripheral. In still other implementations, code is executed directly from the flash memory circuit, such as for operations that do not require high speed (e.g., for non-critical code and device or system setup).

The flash memory interface includes a first in, first out (FIFO) buffer. After a request for data on a coupled flash memory circuit is completed, the flash memory interface speculatively reads data following the address requested by the bus master and stores it in the FIFO. This approach accommodates expected sequential access to the flash memory circuit. If the CPU requests an address of data that is already in the FIFO, the data is provided from the FIFO, which would then be emptied up through and including the data provided and refilled accordingly.

If the CPU requests an address other than any of those in the FIFO, the flash memory interface flushes the FIFO, de-asserts the chip select to terminate the read command, and issues a new read command with the new address. If the FIFO becomes full, the flash memory interface discontinues clocking the flash memory. A timeout for "FIFO full" state de-asserts the chip select to the flash, which places the flash memory in low-power mode.

A generalized manner in which to indicate the format of each command is used by the flash memory interface for both direct operation under software control, and for control information for initiating read operations in memory mode. This generalized approach provides independence from any particular command set used by a flash memory, including whether each part of a command is transferred in serial or quad I/O fashion.

Data transfer is effected in accordance with the particular flash device being used, including capabilities of the device such as the format of commands that the device supports. In some embodiments, initial setup includes a command having a format that is provided by all flash devices, with which the flash interface can be used. After the flash interface sends this command, the flash memory responds with a value (e.g., a 3-byte value) that indicates the flash device's identity and thus its capabilities. The ID value is used (e.g., via software/firmware) to guide the commands issued by the interface.

Table 1 shows pin descriptions and signals sent between a serial peripheral interface flash interface (SPIFI) and a flash memory, for use in connection with one or more example embodiments of the present invention. In some implementations, a pin multiplexing logic circuit alternates these pin functions with one or more other optional functions.

TABLE 1

Device Pin Descriptions

| Pin name | Type | Pin Description |
| --- | --- | --- |
| SCK | Out | Serial clock for the flash memory, switched only during active bits on the MOSI/IO0, MISO/IO1, and IO3:2 lines. |
| CSn | Out | Chip Select for the flash memory, driven low while a command is in progress, and high between commands. In the case of one serial slave, this signal can be connected directly to the device. If more than one serial slave is connected, off-chip hardware and software-implemented functions can use general-purpose I/O signals in combination with this signal to generate the chip selects for the various slaves. |

TABLE 1-continued

Device Pin Descriptions

| Pin name | Type | Pin Description |
| --- | --- | --- |
| MOSI/IO0 | I/O | This is an output except in quad input data fields. After a quad input data field in a single-master application, it becomes an output again one serial clock period after CSn goes high. |
| MISO/IO1 | I/O | This is an output in quad opcode, address, intermediate, and output data fields, and an input in input data fields. After an input data field in a single-master application, it becomes an output again one serial clock period after CSn goes high. |
| IO3:2 | I/O | These are outputs in quad opcode, address, intermediate, and output data fields, and inputs in quad input data fields. After a quad input data field in a single-master application, it becomes an output again one serial clock period after CSn goes high. If the flash memory does not have quad capability, these pins can be assigned to GPIO or other functions. |
| GRANTn | In | Optional input used by devices that are designed to permit multi-master operation. See the GRANTn description in Table 7 for more information. |

Figure 2:
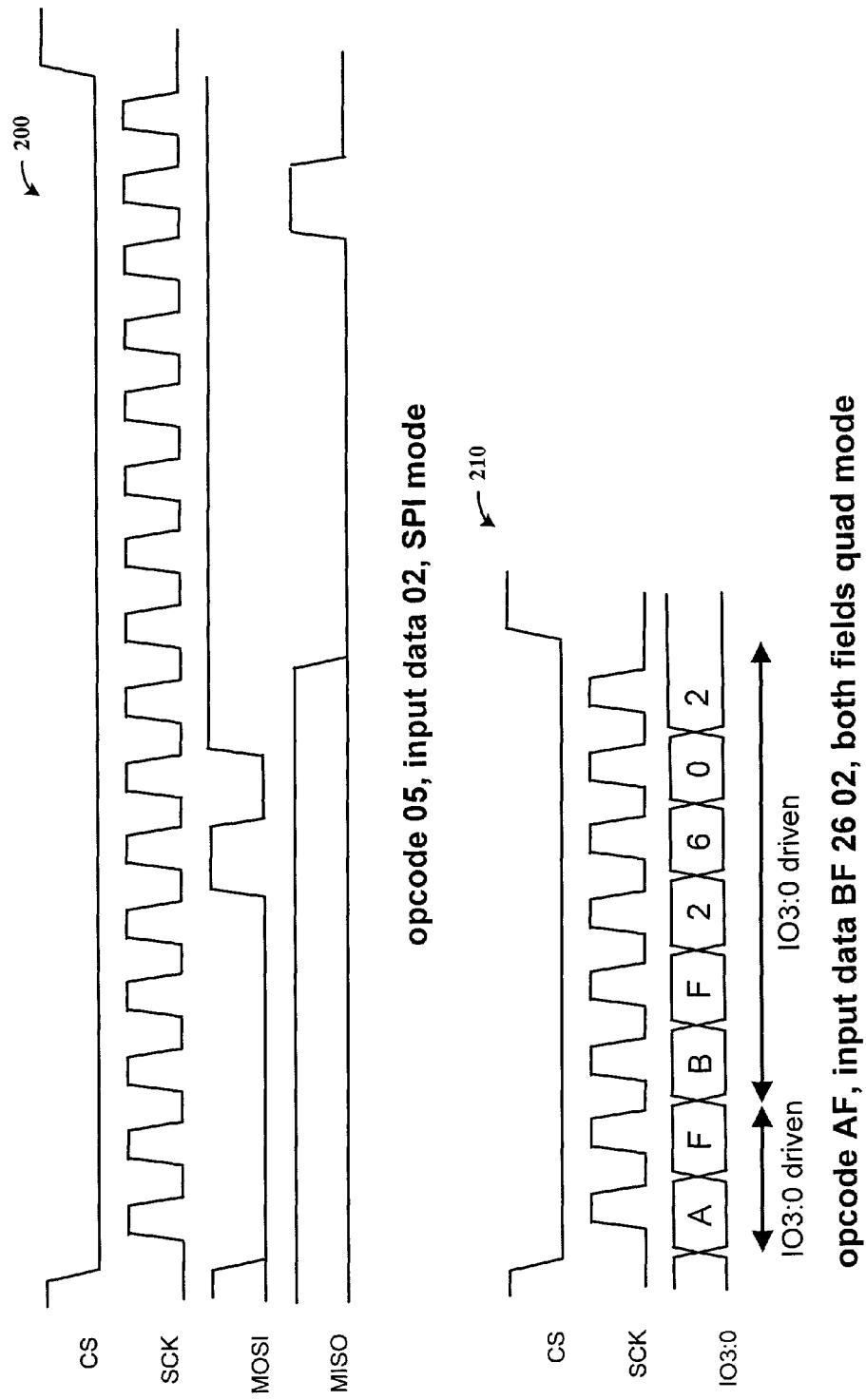
FIG. 2 shows a plot of signals for interfacing with and accessing a flash memory circuit in serial peripheral interface (SPI) and quad modes, in accordance with other example embodiments.

FIGS. 1 and 2 show interface signals for operating a flash memory circuit, as may be implemented in accordance with one or more example embodiments, including those shown in and described in connection with the remaining figures. FIG. 1 shows the transmission of a command consisting of an opcode byte 0x06, respectively sent in serial-peripheral interface (SPI) mode 100 and quad mode 110, in accordance with one or more example embodiments. Bytes are sent with the most significant bit first in a serial-peripheral interface SPI mode, and the most significant bits first in quad mode.

In the above examples, and as may be applied to the various embodiments described herein, the term "SPI" as well as "SPIFI" may refer to devices operating using one or more of serial communications, dual-mode communications, quad mode communications or others. Accordingly, the application of a "serial peripheral interface" as relevant to the abbreviation "SPI" is not limited to serial communications, as might be construed from common use of the term.

FIG. 2 shows interface signals used for two commands that read data from a flash device, in accordance with other example embodiments. In SPI mode, 1 byte is read from the slave. In quad mode, 3 bytes are read from the slave with the opcode and input data fields both in quad mode. In quad mode, the IO3:0 lines are driven by the interface in opcode, address, intermediate and output data fields, and driven by the flash memory in input data fields. In address fields, the more significant bytes are sent first.

Figure 3:
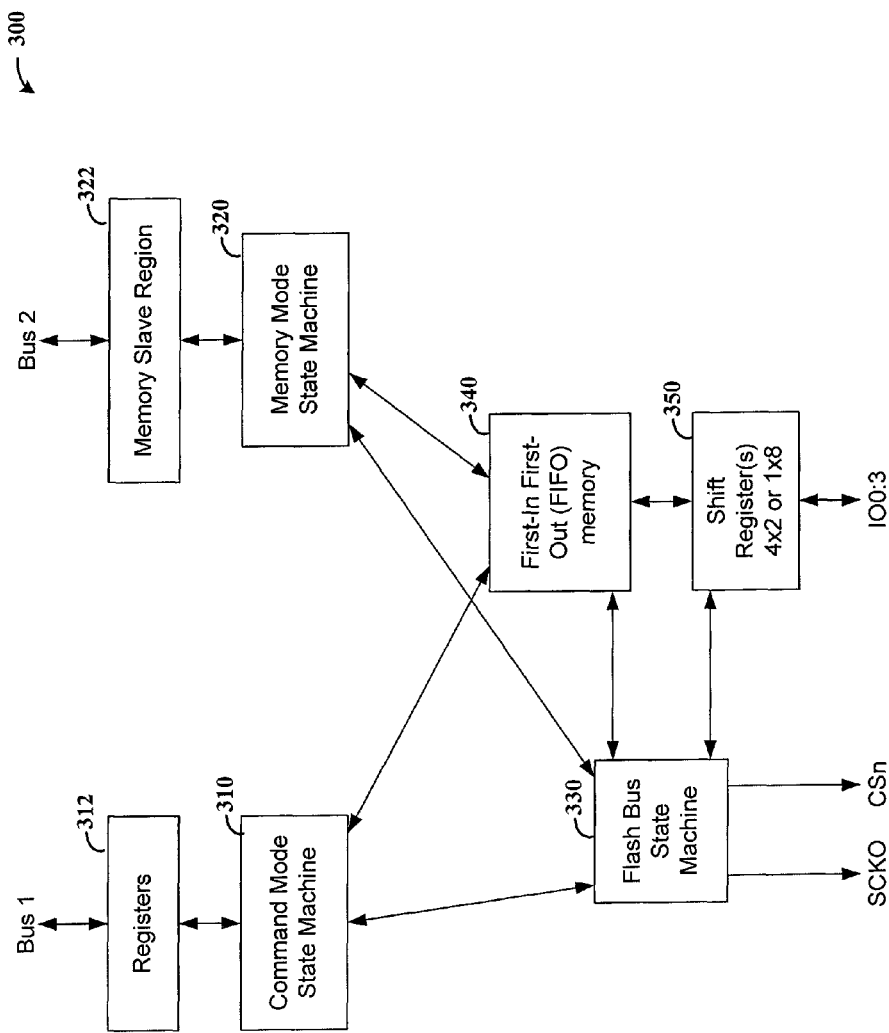
FIG. 3 shows a block diagram of a peripheral flash interface (SPIFI) module, according to another example embodiment.

FIG. 3 shows a peripheral flash interface (SPIFI) arrangement 300, according to another example embodiment. The SPIFI 300 interfaces with a flash memory device in command mode and memory mode (e.g., reading data), as respectively controlled by command mode and memory mode state machines 310 and 320, which operate in accordance with registers 312 and a memory slave region 322 of the device.

The SPIFI 300 also includes a flash bus state machine 330, a FIFO memory 340 and shift register(s) 350. The flash bus state machine passes clock and chip select signals to a flash memory circuit, and further passes signals for controlling the FIFO memory 340 and shift registers 350 to pass data to and from the flash memory circuit.

Figure 4:
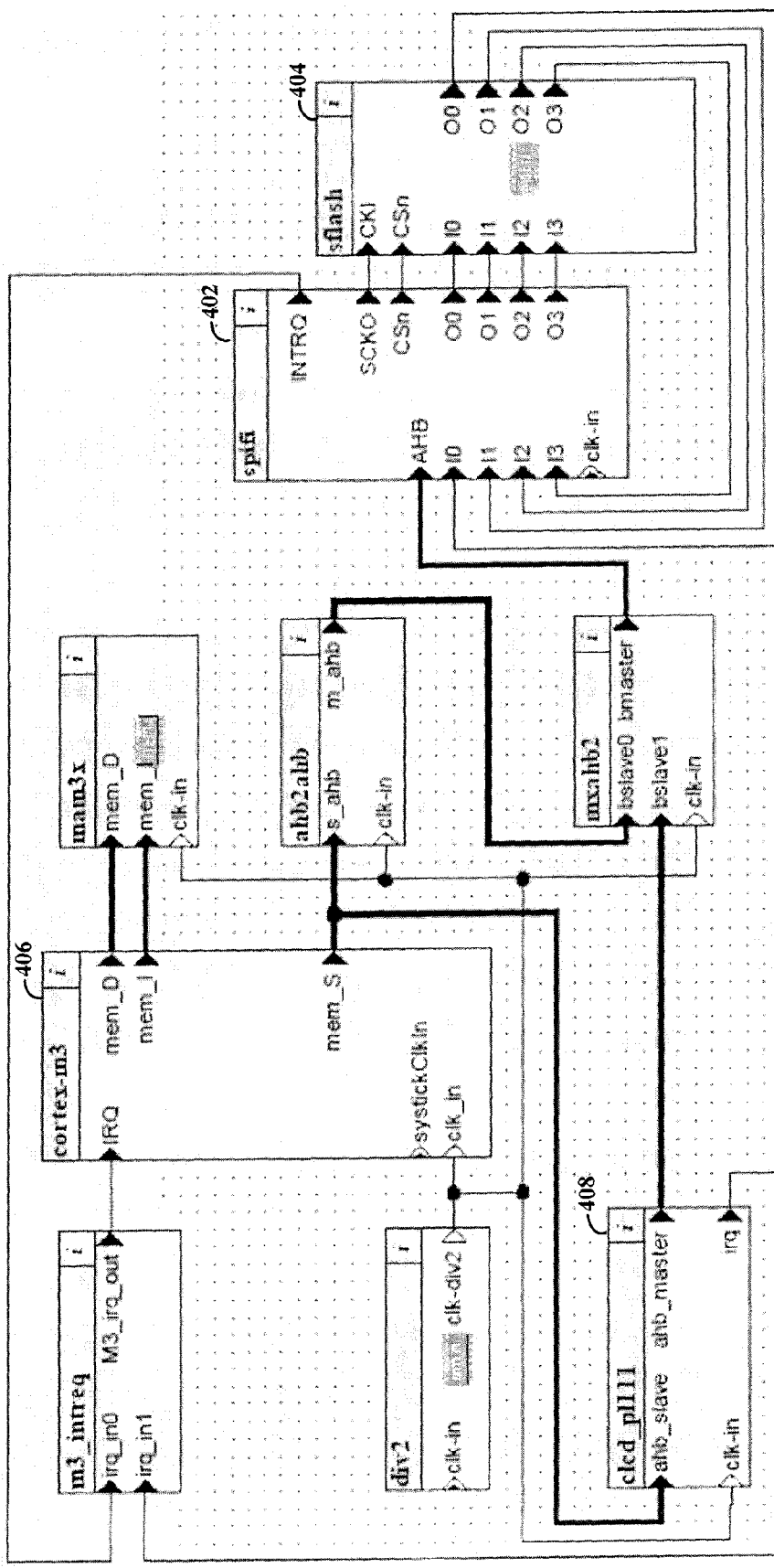
FIG. 4 shows a block diagram utilizing a SPIFI module, according to another example embodiment of the present invention.

The SPIFI 300 can be operated in accordance with a variety of different systems, flash memory circuits, and operational commands, some of which are described above, in the following discussion, and/or in connection with the remaining figures. In this context, FIG. 4 shows a block diagram of a simulation environment with a SPIFI device represented by block 402, and a serial flash device represented by block 404, having respective input/output pins as can be operated, for example, in accordance with the above discussion and tables herein. Additional blocks provide various clock signals and bus functions. The approach shown in FIG. 4 may, for example, be used in connection with a processor circuit 406 such as employed in a computer system and optionally another device such as a display device 408. Where used with a display device, the SPIFI 300 may, for example, interface with a flash memory circuit for storing image data.

According to another example embodiment of the present invention, an external serial flash device is initialized during device setup. In one implementation, the serial flash device is initialized using commands that place the device in a high-performance mode. After the initialization command sequence is complete, a command to be issued, in response to a read from the serial flash region of the memory, is written to a memory command register. In some implementations, attempts to read the flash region before the memory command register is written are aborted.

After the memory command register is written, read access to the serial flash contents is enabled. Such access may include load commands, direct memory access (DMA, such as by programming a DMA channel to read serial flash data and write it to RAM or a peripheral device), and/or instruction execution from the serial flash address region. In one implementation, code is executed directly from the serial flash for code sequences that do not have stringent performance requirements.

Referring again to FIG. 3 by way of example and in connection with an example embodiment, a FIFO buffer 340 provides buffering between the flash memory and other components of the system. The SPIFI 300 maintains a register containing the number of bytes in the FIFO. The SPIFI 300 provides access, such as to a processor executing software or a DMA controller, to read bytes, halfwords, or words from the flash region. When a read from the flash region presents an address for which the corresponding data is not available in the FIFO 340, the SPIFI 300 terminates any command in progress, discards any data in the FIFO, and then issues the command in the memory command register, using the number of least significant bits of the access address indicated by the AMSB field (see, e.g., Table 2) of the control register. Any more significant address bits in the number of address bytes selected by the memory command register are sent as zeroes. Reads from the flash region are delayed if necessary, until (all of) the requested byte(s) is (are) available in the FIFO 340. At that time the SPIFI 300 removes byte(s) from the FIFO 340 through the last one requested. In the event that there are bytes in the FIFO 340 at lower addresses than the requested address, these bytes are discarded.

After returning data from the FIFO 340, the SPIFI 300 reads higher-addressed data from the flash device (coupled at 312) and store it in the FIFO. In the event that the FIFO 340 becomes full, the SPIFI 300 stops clocking the serial flash device, so that no further data is read from the flash until the processor (or DMA controller) reads from the flash region to make room in the FIFO.

In one implementation, the SPIFI 300 drives a chip select (CS) pin (discussed above) via flash bus state machine 330 high to terminate the command and place the serial flash in low-power mode, when the FIFO 340 remains full with no further reading after a read from the flash region, or when the data register is not read after a command is written to the command register that specifies an input data field, for the length of time specified by the TO field (see Table 2) of the control register. Termination of the command will request an interrupt if the INTEN bit (see Table 2) in the command register is set.

The effect of such termination for reading from the flash region is that the SPIFI 300 re-issues the command in the memory command register when a new access to the region occurs. However, if the data register is read or written when an appropriate command is not in progress, the SPIFI 300 issues an abort exception.

According to another example embodiment of the present invention, the SPIFI 300 is used to program or erase a serial flash device in a command mode as follows. An appropriate sequence of commands is written to command, address, and data registers (e.g., at 312), via register addresses outside access the flash region of the address map. When this sequence is completed and an actual erase or program operation is under way in the serial flash device, a Read Status command is issued with a pollRS bit (see Table 3) set in the command register. The SPIFI 300 interrupts the processor when the erase or write operation (and thus the Read Status command) completes if INTEN in the control register is 1, or otherwise permits continual or periodical reading of the status register until it indicates that the Read Status command is complete. After completion of erasing or programming, further programming or erasing can be carried out, or the device may return to memory mode operation, in which data stored in the flash can be read.

The registers 312 may include one or more of a variety of registers (e.g., a control register, command register, address register, intermediate data register, address and intermediate data register, data register, memory command register, and status register), depending upon the application, some of which are discussed above. In one implementation, the registers 312 include control, command, and data registers as follows. The control register controls the overall operation of the SPIFI 300. The control register is written before any commands are initiated, and includes the fields shown in Table 2.

TABLE 2

Control Register

| Bit(s) | Name | Description |
|---|---|---|
| 26:24 | CSHI | This field controls the minimum CSn high time, expressed as a number of serial clock periods minus one. |
| 23 | MODE3 | If this bit is 0, the SPIFI drives SCK low after the rising edge at which the last bit of each command is captured, and keeps it low while CSn is high. If this bit is 1, the SPIFI keeps SCK high after the rising edge for the last bit of each command and while CSn is high, and drives it low after it drives CSn low. |
| 22 | INTEN | If this bit is 1 when a command ends, the SPIFI will assert its interrupt request output. See INTRQ in Table 7 for further details. |
| 21 | CLRID | If this bit is 1, the Intermediate Data register is cleared by Reset and by a write to the Command register, so that future commands containing intermediate data will have zeroes in such fields unless the register is re-written. If this bit is 0, the register is cleared automatically only by Reset. |
| 20:5 | TO | This field contains the number of HCLK periods without the processor or a DMA channel taking or providing data during a command, which will cause the SPIFI hardware to terminate the command by driving the CS pin high and negating the CMD bit in the Status register. This allows the flash memory to enter a lower-power state.<br>The timeout applies after the FIFO has been filled during a read command from the serial flash, or the FIFO has been emptied during a write command to the serial flash. The command in the memory command register is issued again if the processor or DMA channel subsequently comes to read data from the flash region again. The SPIFI hardware responds with a Data Abort if the processor or a DMA channel reads or writes the Data register when an appropriate command is not in progress. |
| 4:0 | AMSB | This field identifies the most significant address bit of a complete internal flash address, and can be set to match the (total) size of the attached device(s). When sending an address in a command, the SPIFI will send zeroes in bits above this number.<br>$23_{10}$ = 0x17 for 128 Mbits (16 Mbytes)<br>$22_{10}$ = 0x16 for 64 Mbits (8 Mbytes) |

TABLE 2-continued

Control Register

| Bit(s) | Name | Description |
|---|---|---|
| | | $21_{10}$ = 0x15 for 32 Mbits (4 Mbytes)<br>$20_{10}$ = 0x14 for 16 Mbits (2 Mbytes)<br>$19_{10}$ = 0x13 for 8 Mbits (1 Mbytes) |

The command register includes the fields shown in Table 3. In some implementations, the command register can only be written as a word, but bytes, halfwords, and words can be read from the command register. When the command register is written, any previous command in progress with the serial flash device is terminated, memory mode is cleared, data in the FIFO 340 is discarded, and the new command is transmitted. In some implementations, for a command that contains an address and/or intermediate data, Address and/or Intermediate Data Register(s) are written before the command register is written. In the event that the command contains output data, the output data is written to the data register after writing to the command register, and if the command contains input data, the input data is read from the data register after writing to the command register.

The address register is used as follows. When a command includes an address field, the address is written to the address register before the associated command is written to the command register. For commands that use 3-byte and 4-byte address fields, only the number of least-significant bits of the address register given by the AMSB field of the control register are sent to the device. Any more-significant bits of the address field are sent as zeroes as described in Table 2. The contents of the address register are captured into a working register when the command register is written, so that the address register can be written again in preparation for a subsequent command.

An intermediate data register is used as follows. Before writing a command that requires specific intermediate byte values, the value of the byte(s) is written to the intermediate

TABLE 3

Command Register

| Bit(s) | Name | Description |
|---|---|---|
| 31:24 | opcode | The opcode of the command (not used for some frameForm values). |
| 23:21 | frameForm | This field controls the opcode and address fields:<br>000 used in all-zero value to terminate a command or memory mode<br>001 opcode only<br>010 opcode, LS byte of address<br>011 opcode, 2 LS bytes of address (MS byte first)<br>100 opcode, 3 LS bytes of address (MS byte first)<br>101 opcode, 4 bytes of address (MS byte first)<br>110 no opcode, 3 LS bytes of address (MS byte first)<br>111 no opcode, 4 bytes of address (MS byte first) |
| 20:19 | P/S | This field controls how the fields of the command are sent:<br>00 all fields of the command are serial<br>01 data field is quad on IO3:0. other fields are serial on IO0<br>10 opcode field is serial on IO0, other fields are quad on IO3:0<br>11 all fields of the command are in quad format |
| 18:16 | intLen | This field controls how many "intermediate" bytes precede the data. (Each such byte may require 8 or 2 SCK cycles, depending on whether the intermediate field is in serial or 4-bit format.) Intermediate bytes are output by the SPIFI, and include post-address control information, "dummy" and delay bytes. See the description of the Intermediate Data register for the contents of such bytes. |
| 15 | DOUT | If the dataLen field is nonzero, this bit controls the direction of the data:<br>0 = input from serial flash<br>1 = output to serial flash |
| 14 | pollRS | This bit is written as 1 only with an opcode that a) contains an input data field, and b) causes the serial flash device to return byte status repetitively (e.g., a Read Status command). When this bit is 1, the SPIFI hardware will continue to read bytes in the input status field until a test specified by the dataLen field is met. The hardware captures each such byte so that it can be read from the data register, and tests the bit in each status byte selected by dataLen bits 2:0, until a bit is found that is equal to dataLen bit 3. At that time the SPIFI terminates the command by raising CSn. The end-of-command interrupt can be enabled to inform software when this occurs. |
| 13:0 | dataLen | Except when pollRS is 1 as described above, this field controls how many data bytes are in the command. 0 indicates that the command does not contain a data field. All ones indicates that the command can include any number of data bytes. | data register. In the event that more than one intermediate byte is specified in the command register, the LS byte written to the intermediate data register is sent first. If more intermediate bytes are specified in the command register than were provided in the most recent write to this register, zeroes are sent in the subsequent bytes. The contents of the intermediate data register are captured into a working register when the command register is written, so that the intermediate data register can be written again in preparation for the next command or for memory mode. If the CLRID bit in the control register is 1, the intermediate data register is then cleared so that future commands containing intermediate data fields will have zeroes in them unless the intermediate data register is rewritten for each command. For serial flash devices that require dummy (delay) bytes in certain commands, the intermediate data register need not be written before issuing those commands.

An address and intermediate register address that is restricted to word accesses is used as follows. An address and an intermediate byte value are written to the register in one write operation for commands that use both fields with less than 4 bytes of address. When a word is written to this address, bits 23:0 are written to the address register and bits 31:24 are written to bits 7:0 of the intermediate data register. In some implementations, this register address can be used to set a flash address and an "M7-M0" byte for Winbond devices with 16 MBytes/128 Mbits or less (available from Winbond of San Jose, Calif.).

The data register is used as follows. After initiating a command that includes a data output field by writing to the command register, the output data is written to the data register. Store Byte instructions provide one data byte, Store Halfword instructions provide two bytes, and Store Word instructions provide 4 bytes of output data. Store commands are delayed if the FIFO 340 is too full to accept the number of bytes being stored. For Store Halfword and Store Word, the LS byte is sent first. After initiating a command that includes a data input field by writing to the command register, input data is read from the data register. Load Byte instructions deliver one data byte, Load Halfword instructions deliver two bytes, and Load Word instructions deliver 4 bytes of input data. Load commands are delayed if the FIFO 340 does not contain the number of bytes being loaded. For Load Halfword and Load Word commands, the LS byte was received first. In one implementation, for commands that include a dataLen value other than all-ones, no more than (dataLen) bytes are read from or written to the data register, and the data register is not used in connection with reading the flash address range in the memory map. In DMA transfers in peripheral to-or-from-memory mode, the data register is set as the peripheral address.

A memory command register is used as follows. Before accessing the flash area of the memory map, the SPIFI 300 is set up using the registers described above. A word is then written to the memory command register to define the command that will be sent to the serial flash to read data from the device, when data is read from the flash area. Thereafter, data can be read from the flash memory area, either directly or using a DMA channel. When the memory command register is written, the SPIFI 300 is set in memory mode. In one implementation, the content of the memory command register are identical to that of the command register, except as shown in Table 4.

TABLE 4

Memory Command Register Differences from Command Register

| Bit(s) | Name | Description |
|---|---|---|
| 23:21 | frameForm | 000-011: these commands have no known use in this register<br>110-111: the first time that the bus master accesses data from the serial flash memory region after the command register was written, these commands send the opcode in bits 31:24 of this register, so that 11x operates like 10x. For subsequent commands, caused by timeouts or breaks in ascending address sequence, the opcode is not sent, so that operation is like when 11x is written to the command register. |
| 15:14 | DOUT, pollRS | These bits should be written as 0. |
| 13:0 | dataLen | Do not write 0 to this field in this register. All ones can be written to this field to indicate that any amount of data can be read in one command (as long as a timeout does not occur). Other non-zero values will cause the command to be automatically terminated after that number of bytes is read, so that a new command will be issued to the device if the bus master reads more sequential data. |

In some implementations, the registers 312 also include a status register. The status register is a read-only register that indicates the state of the SPIFI 300, and includes the fields shown in Table 5.

TABLE 5

Status Register

| Bit(s) | Name | Description |
|---|---|---|
| 0 | MCINIT | This bit is 1 if the memory command register has been written since Reset. |
| 1 | CMD | This bit is 1 while a command is in progress between the SPIFI and the serial device. A 1-to-0 transition on this bit causes a SPIFI interrupt request if the INTEN bit in the control register is 1. |

TABLE 5-continued

Status Register

| Bit(s) | Name | Description |
|---|---|---|
| 2 | MCMD | This bit is cleared by Reset and by a write to the command register. It is set when a command is initiated by a read from the memory area with MCINIT 1. |
| 3 | CMDI | This bit is cleared at the start of a command, and set if and when the command begins reading from the serial flash. |
| 12:8 | FIFObytes | This field indicates the number of bytes currently in the FIFO. 0 means the FIFO is empty. |

According to an example embodiment of the present invention, the flash interface (e.g., SPIFI 300) is configured to connect to an AHB (high-performance bus) and operates in accordance with signals as represented in Table 6, as described further below.

TABLE 6

SPIFI AHB Signals

| Signal | Direction | Description |
|---|---|---|
| HCLK | In | AHB clock. Most of the SPIFI logic is clocked by this signal. |
| HRESETn | In | Low-active master reset. |
| HSELmem | In | A high on this signal indicates an access to the serial flash memory region. |
| HSELreg | In | A high on this signal indicates an access to the SPIFI registers. |
| HADDR31:0 | In | AHB address. When HSELreg is high, the SPIFI need only decode HADDR2 and enough more significant address lines to differentiate among the various SPIFI registers. That is, the SPIFI registers are aliased throughout the address region allocated for them. When HSELmem is high, the SPIFI captures the state of HADDR0 up through the bit number specified by the AMSB field in the control register, and should pass that address to the serial flash device when necessary. After each access to the serial flash memory region is completed, the SPIFI hardware should continue to access (higher-addressed) serial flash data as long as the FIFO is not full and the bus master does not request other data. |
| HRDATA31:0 | Out | AHB read data. These are byte-laned, such that data for byte addresses having the following values of HADDR1:0 should be returned on the lines indicated:<br>00 HRDATA7:0<br>01 HRDATA15:8<br>10 HRDATA23:16<br>11 HRDATA31:24 |
| HWDATA31:0 | In | AHB write data. These are byte-laned: data for byte addresses should be captured from these lines in the same fashion shown for HRDATA above. |
| HTRANS1 | In | Indicates the type of bus cycle. The SPIFI should do nothing in clocks when HTRANS1 is 0 and/or both HSEL signals are low. It should respond when one of the HSEL signals is high and HTRANS1 is 1. |
| HWRITE | In | Indicates the direction of transfer when HTRANS1 is 1 (H = write). |
| HSIZE2:0 | In | Indicates the width of the requested data transfer when HTRANS1 is 1:<br>000 Byte<br>001 Halfword<br>010 Word<br>The SPIFI responds with an ERROR on the HRESP lines if these lines carry a value greater than 010. |
| HRESP1:0 | Out | Indicate whether a requested transfer could be completed:<br>00 OKAY transfer not yet completed, or successfully completed<br>01 ERROR results in an abort on the bus master |
| HREADY | Out | Low indicates that the requested transfer is not yet complete. Driven low in the following situations:<br>When the bus master reads an address in the serial flash region, and the data for that access is not completely present in the FIFO. |

TABLE 6-continued

SPIFI AHB Signals

| Signal | Direction | Description |
|---|---|---|
| | | When the bus master reads the data register, and the width of data requested is not yet in the FIFO. When the bus master writes to the data register, and the FIFO doesn't have room for the data provided. |

According to another example embodiment, a SPIFI (e.g., 300) connects to the signals shown in Table 7, relative to the serial flash and other portions of the device containing the flash interface.

TABLE 7

SPIFI I/O Signals

| Signal | Direction | Description |
|---|---|---|
| SCKI | In | Serial clock. This signal clocks the serial shift register, and is divided by 2 to produce SCKO during active commands. |
| SCKO | Out | Clock to the SCK pad cell or the in-package serial device |
| CSn | Out | Chip Select to the CSn pad cell or the in-package serial device |
| I0 | In | Input from the IO0 pad cell or the in-package serial device |
| O0/MOSI | Out | Output to the IO0/MOSI pad cell or the in-package serial device |
| OEN320 | Out | Controls the direction of the IO0/MOSI and IO3:2 pad cells |
| I1/MISO | In | Input from the IO1/MISO pad cell or the in-package serial device |
| O3:1 | Out | Outputs to the IO3:1 pad cells or the in-package serial device |
| OEN1 | Out | Controls the direction of the IO1/MISO pad cell |
| I3:2 | In | Inputs from the IO3:2 pad cells or the in-package serial device |
| INTRQ | Out | Interrupt request to the interrupt controller. Set at the end of a command if the INTEN bit is 1. Cleared by Reset, by reading the Status register, and by writing the Command register. |
| GRANTn | In | Ground this input to disable multi-master operation. Otherwise, connect it to a low-active grant signal from an external arbiter that will be high by the trailing edge of Reset. The SPIFI captures the state of this input at the end of Reset. It it's low at the end of Reset, the SPIFI drives OEN320 high after an input command, and OEN1 high after a quad input command, 2 SCKI periods (1 SCKO period) after driving CSn high. If this input was high at the end of Reset, the SPIFI drives OEN320 and OEN1 low (if necessary) 1 SCKI period after driving CSn high between frames, and after it asserts CSn low it waits for this input to be low before asserting OEN320 high (and OEN1 high in Quad mode). The multi-master mode increases the time required to send each command by 2 SCKI periods (1 SCKO period) for synchronization of GRANTn. |
| DMACBREQ | Out | DMA Request |
| DMACCLR | In | DMA Request Clear signal |

Figure 5:
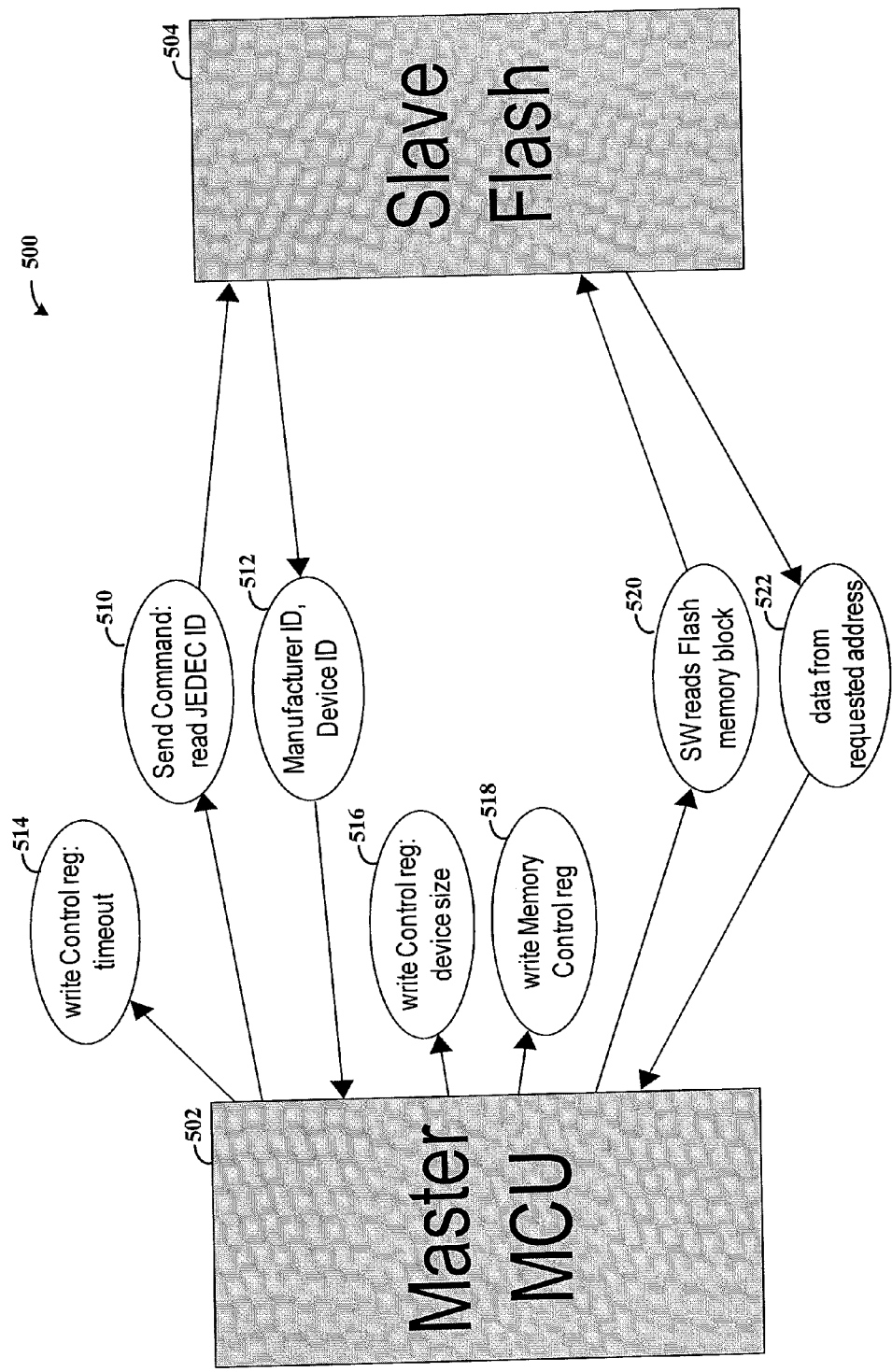
FIG. 5 shows a data-flow diagram for initial setup of a processor-flash memory module, according to another example embodiment of the present invention.

FIG. 5 shows an example startup sequence through a first memory mode access for an arrangement 500, according to another example embodiment. A master controller (microcontroller unit MCU) 502 controls a slave flash memory 504, using a sequence of steps 510-522, one or more of which may be implemented in accordance with the description above. For example, after reset, the master sends an identification read command 512 to the slave, which responds by sending its identification data 514, such as manufacturer ID and device ID. This information can be used in configuring subsequent communications and operations with the slave 504, such as by using the identification to determine a command set that works with the flash memory 504. Writes are performed in steps 510 (timeout), 512 (command), 516 (control register) and 518 (memory control register), and reads are done in steps 514 and 522.

Figure 6A:
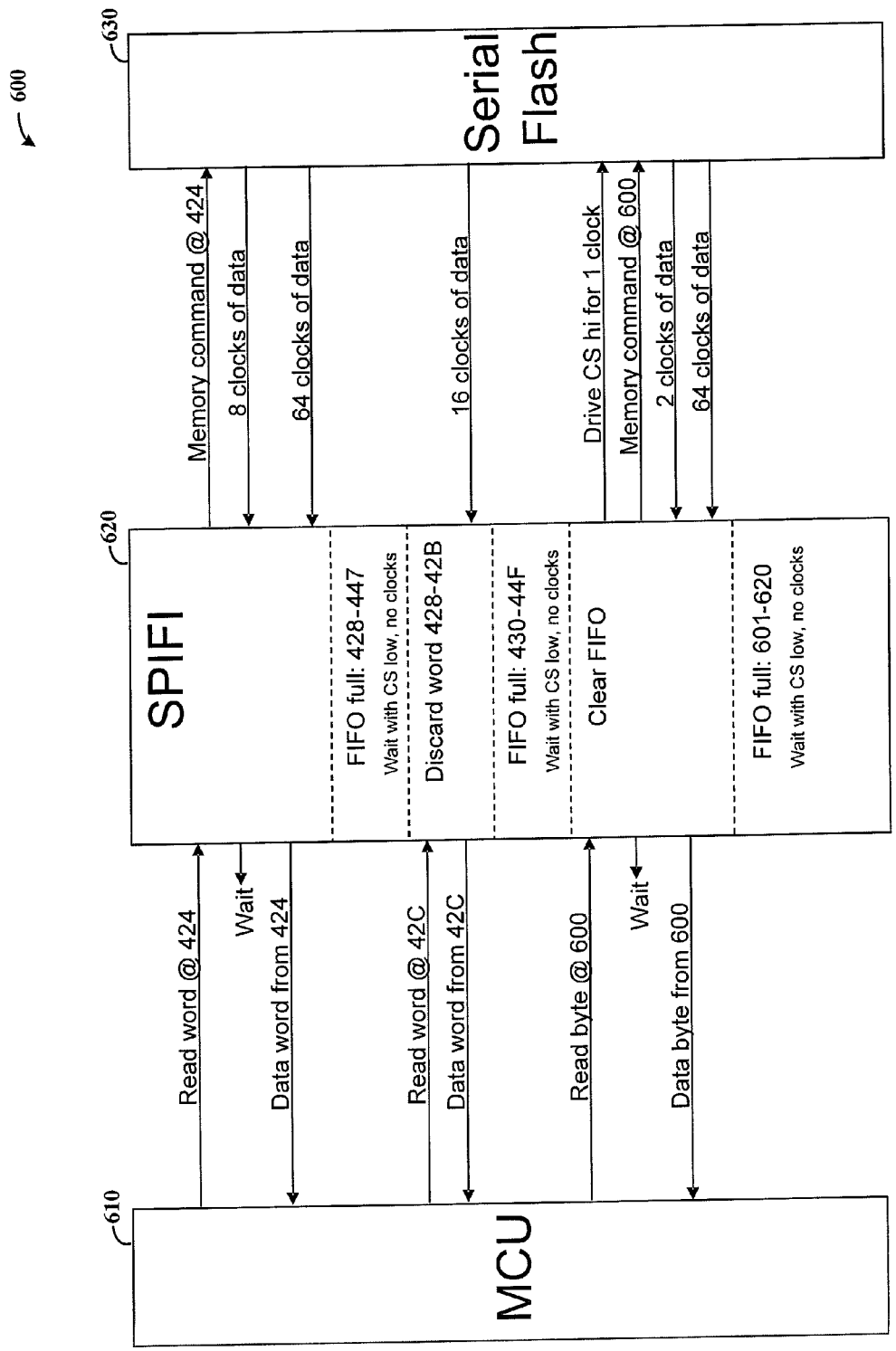
FIGS. 6A and 6B show a flash memory interface system operating in memory mode, according to another example embodiment of the present invention.
Figure 6B:
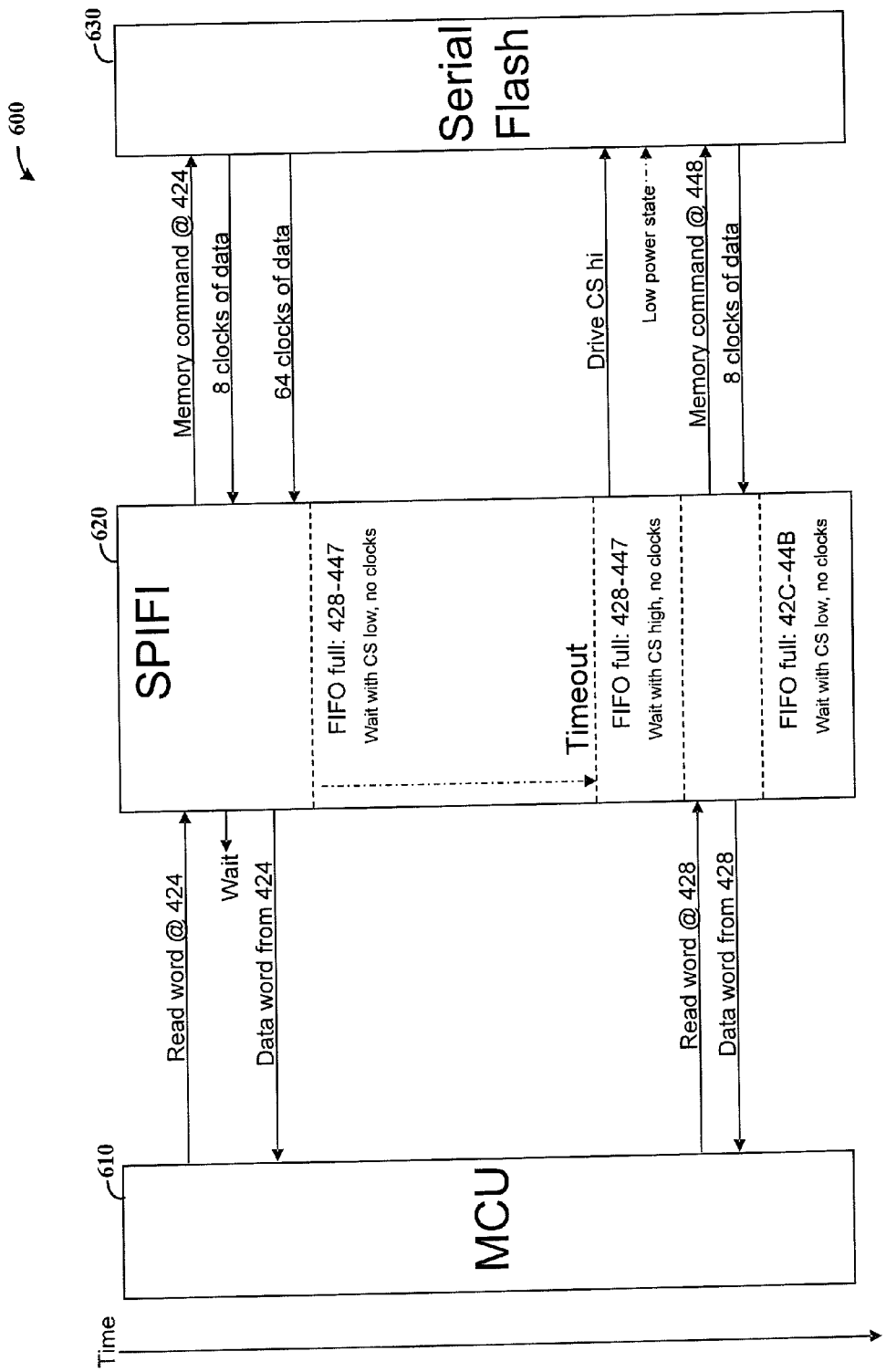

FIGS. 6A and 6B show a system 600 including an MCU 610, a flash interface circuit (SPIFI) 620 and a flash memory circuit 630 operating in memory mode without and with timeout, respectively. Addresses are represented in hexadecimal (base 16) notation. The SPIFI 620 and flash memory circuit 630 may operate in accordance with one or more example embodiments as discussed herein, with various control and data passed as shown. For example, when the MCU 610 requests a word at 424 from the SPIFI 620, the SPIFI sends a wait response to the MCU while data is retrieved, and sends a memory command including address 424 to the flash memory circuit, which responds by sending data to the SPIFI to meet the request and thereafter to fill the FIFO with sequential addresses.

When the MCU 610 then requests a word at 42C, the SPIFI 620 discards words 428-42B, returns the requested word to the MCU from the FIFO, and reads additional sequential addresses from the serial flash 630 to fill the FIFO.

When the MCU 610 then requests a byte at 600, the SPIFI 620 sends a wait response to the MCU, clears the FIFO because byte 600 is not present in the FIFO, drives CS high for one clock to terminate the previous command, and then sends a memory command including address 600 to the flash memory circuit 630. In response, the flash memory circuit 630 sends two clocks to obtain the data for the byte at 600. The SPIFI continues to produce additional clock pulses until the FIFO buffer is filled from subsequent addresses.

FIG. 6B shows similar operation, with a timeout occurring between providing words 424 and 428, and the provision of word 428 from the FIFO buffer to the MCU 610 without delay, but with activity resumed thereafter to re-fill the FIFO.

Figure 7:
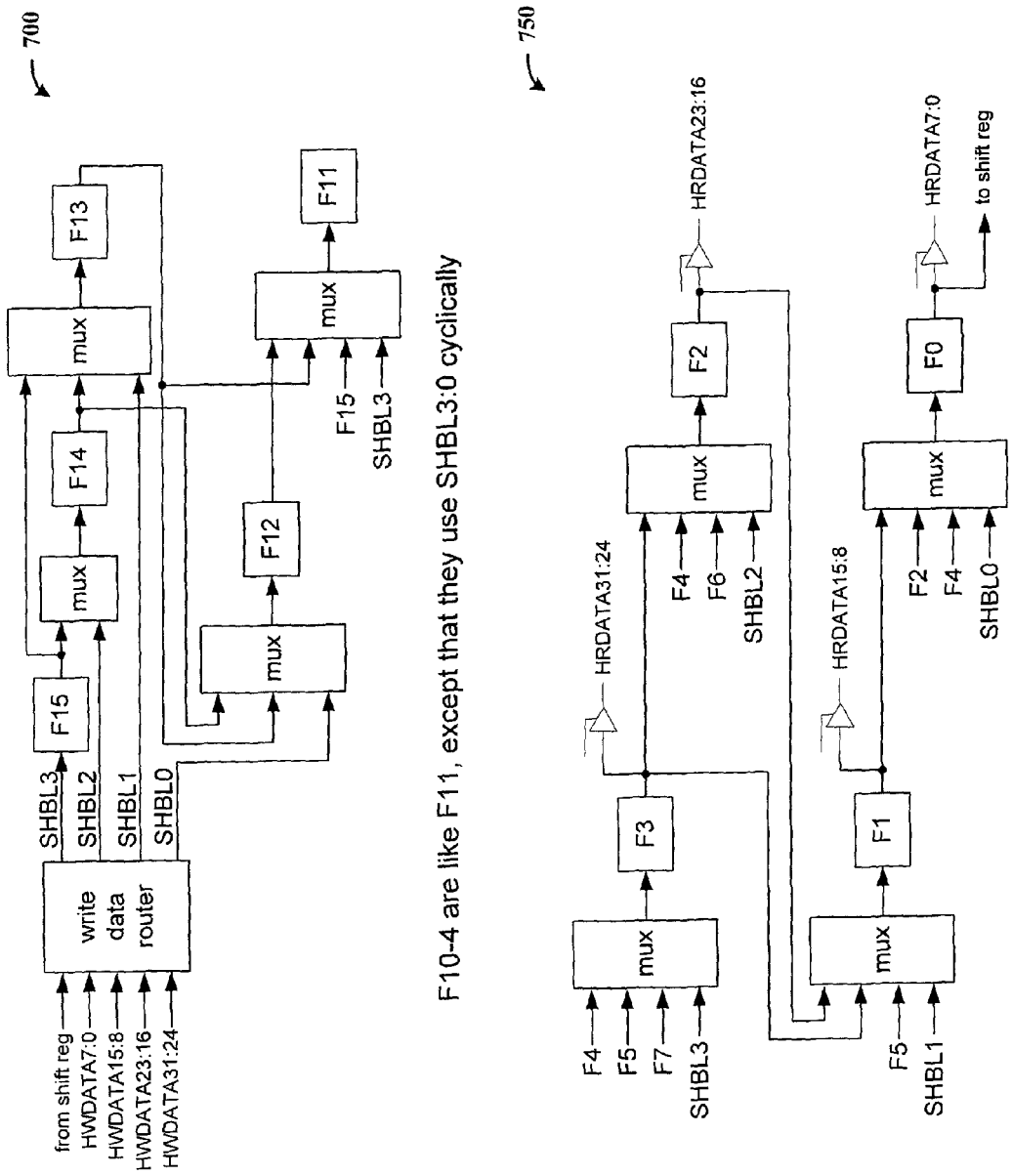
FIG. 7 shows a FIFO block diagram for implementation with a flash memory circuit, according to another example embodiment of the present invention.

FIG. 7 shows a FIFO block diagram 700 for implementation with a FIFO and flash memory circuit, according to another example embodiment of the present invention. The FIFO includes sixteen byte registers numbered F15-F0 and stands between a shift register that transfers data to or from serial flash and HWDATA and HRDATA buses that transfer data from or to a bus master. In some implementations, the bus interface and most of the FIFO are clocked by the bus clock, the shift register(s) is (are) clocked by SCKI, and synchronization logic is either built into the FIFO or placed between the FIFO and the shift register(s).

When there is data in the FIFO, F0 contains the byte that is next to be delivered to the shift register or that will be placed on HRDATA7:0 in the next read operation by the bus master. When the FIFO is full, F15 contains the last byte stored from the shift register, or the byte from the most significant byte in the last write to the data register. The outputs of F0 are connected to the parallel-load inputs of the shift register. During a read from the serial flash address region or a read from the data register, the outputs of F0 are driven onto HRDATA7:0. The output of F1 is driven onto HRDATA15:8 for a halfword or word read, and optionally for a byte read. The outputs of F3-F2 are driven onto HRDATA31:16 for a word read and optionally for a halfword or byte read.

The parallel outputs of the shift register and HWDATA are connected to a write data router having four 8-bit outputs called Shifted Byte Lanes, or SHBL0[7:0] through SHBL3 [7:0]. SHBL0 is the "write input" for byte registers F0, F4, F8, and F12. SHBL1 is the write input for F1, F5, F9, and F13. SHBL2 is the write input for F2, F6, F8, and F14. SHBL3 is the write input for F3, F7, F11, and F15. SHBL3 goes directly to the D inputs of F15. The D inputs of F14-F0 are connected to the outputs of multiplexers, each of which selects between its write input and the Q outputs of one (F14), two (F13-F12) or three (F11-F0) "shift inputs" from higher-numbered byte registers. Each byte register also has an enable input that controls whether data is clocked from its D inputs to its Q outputs on each rising edge of HCLK.

The DOUT bit in the command register controls the direction of data flow between the bus master and the shift register during commands written to the command register. If DOUT is 1, data is written to the FIFO using the address of the data register, and the data is transferred through the FIFO to F0 and then to the shift register and the serial flash. If DOUT is 0 (and for accesses to the serial flash address region) data is written into the FIFO from the shift register, and the data travels through the FIFO to F0 to F3, from which it is read by the bus master.

The operation of the FIFO is also controlled by a "bytes in FIFO" register. This 5-bit register can contain 0 indicating that the FIFO is empty, through 16 indicating that the FIFO is full. The number of "retained bytes" is "bytes in FIFO" less the number of bytes that will be removed from the FIFO at the end of the clock. The number of bytes removed from the FIFO is 1 in a clock at the end of which write data will be loaded into the shift register, 1 in a clock in which a byte of data is read (with HREADY high) by the bus master, 2 in a clock in which a halfword of data is read with HREADY high, 4 in a clock in which a word of data is read with HREADY high, and 0 otherwise.

During each clock, "next bytes in FIFO" is the "retained bytes" value plus the number of bytes written into the FIFO in that clock. This result is loaded into the "bytes in FIFO" register at each clock rising edge. The number of bytes written into the FIFO is 1 in a clock at the end of which data is written into the FIFO from the shift register, 1 in a clock in which a byte of data is written into the FIFO by the bus master with HREADY high, 2 in a clock in which a halfword of data is written by the bus master with HREADY high, 4 in a clock in which a word of data is written by the bus master with HREADY high, and 0 otherwise. In a clock in which the number of bytes removed from and/or written into the FIFO is (are) non-zero, and the "next bytes in FIFO" value is greater than zero, the enable lines of byte registers F0 through F["next bytes in FIFO"-1] are asserted so that data is shifted and/or loaded in the FIFO.

The control inputs of the input multiplexers for each byte register "i" are driven to one of four states "write," "byte shift," "halfword shift," and "word shift." The "shift" values are driven only in clocks in which bytes are being removed from the FIFO, and then only to byte registers for which i<"retained bytes". "Word shift" is driven when the bus master is reading a word with HREADY high, "halfword shift" is driven when the bus master is reading a halfword with HREADY high, and "byte shift" is driven when the bus master is reading a byte with HREADY high or a byte is being transferred from F0 to the shift register. Input multiplexer controls are set to "write" in all other cases and clocks, although writing occurs only for registers whose Enable inputs are asserted as described above.

The input multiplexers for F0-F11 select among their SHBL write input, the output of F[i+1] for a byte shift, the output of F[i+2] for a halfword shift, and F[i+4] for a word shift. The input multiplexers for F12 and F13 select among their SHBL write input, the output of F[i+1] for a byte shift, and the output of F[i+2] for a halfword shift. The input multiplexer for F14 selects between the SHBL2 write input and the output of F15 for a byte shift. F15 has no input multiplexer.

The write data router routes the byte from the shift register to all four SHBL buses when DOUT is 0 or during accesses to the serial flash address region. When a command initiated by writing DOUT=1 to the command register is in progress, the write data router routes the bytes on HWDATA31:0 onto the SHBL lines under control of the two least significant bits of the "retained bytes" value as shown in Table 8.

TABLE 8

Write Data Routing for direct command with DOUT = 1

| | HWDATA byte placed on | | | |
|---|---|---|---|---|
| "retained bytes"[1:0] | SHBL3 | SHBL2 | SHBL1 | SHBL0 |
| 00 | 31:24 | 23:15 | 15:8 | 7:0 |
| 01 | 23:15 | 15:8 | 7:0 | 31:24 |
| 10 | 15:8 | 7:0 | 31:24 | 23:15 |
| 11 | 7:0 | 31:24 | 23:15 | 15:8 |

According to another example embodiment of the present invention, a SPIFI device is configured to operate in a peripheral mode DMA operation. The HREADY line is driven and wait states are inserted when necessary during read and write operations by the bus master, to maintain synchronization between bus master accesses and serial data transfer with a serial flash memory circuit. This mechanism facilitates load and store accesses and "memory to memory" transfers by a DMA channel.

According to another embodiment of the present invention, a SPIFI is configured to operate in a mode that supports DMA transfers in which the SPIFI acts as a peripheral and drives a request signal to a DMA channel to control data transfer. This mode is different from "memory to memory" operation, and may be useful in systems in which the code and/or data is dynamically fetched from the serial flash into RAM on as "as needed" basis. Clock cycles are thus not lost to wait states, and the overall operation of the processor and DMA channels is more efficient. In one implementation, the DMA peripheral mode is operated as appropriate for the ARM PL080 DMA Controller (DMAC) or related controller available from ARM of San Jose, Calif. The DMAC is programmed/configured to present word read operations at the fixed address of the data register, to have a source burst size of 2 words, and a transfer size of an even number of words. The SPIFI drives a DMACBREQ signal to the DMAC, and receives a DMAC-CLR signal from it. To use the DMA peripheral mode, the command register is written to start the command, and a DMA channel is programmed as described above, to read data from the data register and write it into RAM. The SPIFI asserts DMACBREQ when: a command is in progress (CMD is 1), MEMMODE and DOUT are both 0, there are 8 or more bytes in the FIFO, and DMACCLR is negated (low).

The various embodiments as discussed herein may be implemented using a variety of structures and related operations and functions. For instance, the bus master may communicate with the flash interface via separate buses to access the registers and the mapped flash region, or via a single bus for access to both sets of addresses. As another example, while most of the descriptions herein may involve software or firmware that plays a role in adapting to different flash memory devices, various embodiments are directed to implementations in which the hardware includes all necessary resources for such adaptation, without necessarily requiring any involvement of software and/or firmware. Also, various descriptions herein show include hardware having a number of interacting state machines, but aspects of these and other embodiments may include implementations in which the hardware is organized into a different set and/or number of state machines, including a single state machine, as well as random-logic implementations that may not be clearly mapped to any number of finite-state machines. While various embodiments can be realized via hardware description language that is computer-synthesized to a library of standard modules, aspects of the invention should also be understood to cover other implementations including, but not limited to, field-programmable or masked gate arrays, seas of gates, optical circuits, board designs composed of standard circuits, microcode implementations, and software- and firmware-dominated implementations in which most or all of the functions described as being implemented by hardware herein are instead accomplished by software or firmware running on a general- or special-purpose processor. These embodiments may also be used in combination, for example certain functions can be implemented using programmable logic that generates an output that is provided as an input to a processor.

Based upon the above discussion and illustrations, those skilled in the art will readily recognize that various modifications and changes may be made to the present invention without strictly following the exemplary embodiments and applications illustrated and described herein. Such modifications and changes may include, for example, using interface characteristics incorporating one or more of a variety of approaches for SPI-based memory operation and communications. One such example involves flash-type memory devices and operational characteristics of devices such as those available from Winbond of San Jose, Calif., and from Silicon Storage Technology of Sunnyvale, Calif. These and other modifications do not depart from the true spirit and scope of the present invention, including that set forth in the following claims.

What is claimed is:

1. A peripheral interface circuit for interfacing between a computer processor and a flash memory circuit communicatively connected to the interface by a peripheral interface bus, for storing and providing access to data that is stored on the flash memory circuit and mapped as a portion of main processor memory, the interface circuit comprising:
 a first-in, first-out (FIFO) buffer coupled to receive data from and store data for the flash memory circuit and to provide read access to the stored data; and
 an interface controller configured to
  communicate with the flash memory circuit via the peripheral interface bus,
  initialize the flash memory circuit for providing data to the FIFO buffer as a portion of the main memory,
  in response to a request for data starting at an address in a portion of main memory and having at least a portion thereof stored in the FIFO buffer, control the FIFO buffer to provide access to the stored data and control the flash memory circuit to provide additional data from subsequent addresses in the flash memory circuit to the FIFO buffer, and
  in response to a request for data starting at an address in portion of main memory and not stored in the FIFO buffer, control the flash memory circuit to provide the requested data and additional data from subsequent addresses in the flash memory circuit to the FIFO buffer.

2. The interface circuit of claim 1, wherein the interface controller is configured to communicate with different types of said flash memory circuits respectively operating on disparate commands, by
 communicating with the flash memory circuit to retrieve identification information from the flash memory circuit, and
 in accordance with the retrieved identification information, select and use a particular command set for initializing, communicating with and controlling the flash memory circuit.

3. The interface circuit of claim 1,
 further including a register having control information including
  an opcode field containing an opcode,
  a frame format field that indicates whether the opcode is to be sent and how many address bytes are to be sent,
  a parallel/serial field that indicates which of the fields in the command are sent or received in serial SPI protocol, and which of the fields in the command are sent or received in 4-bit parallel (quad) protocol,
  an intermediate length field indicating how many intermediate data bytes are to be sent between the opcode and/or an address, and the data,
  a data out bit controlling whether data is sent to or received from the flash memory circuit,
  a poll read status bit controlling whether the flash interface should read data bytes continuously from the flash memory circuit until a byte is received that meets a condition selected by a data content field, and said data content field for controlling different operational aspects based upon the poll read status bit, including for a poll read status bit of 0, indicating the number of bytes of data to be sent or received in a command, with an all-ones value indicating an unlimited number, and for a poll read status bit of 1, containing three bits selecting which bit of each byte read from the flash memory circuit is to be tested for command completion, and a fourth bit indicating the bit state that indicates completion of the command; and wherein the interface controller is configured to determine the format and operation of a command to be sent and performed with the flash memory circuit, based upon the data in the register.

4. The interface circuit of claim 1, wherein the interface controller is configured to operate the flash memory circuit in an erase mode to erase data on the flash memory circuit, operate the flash memory in a programming mode to store data in the flash memory, and receive and store the data in the flash memory circuit mapped as a portion of main memory in a read-only mode.

5. The interface circuit of claim 1, wherein the interface controller is configured to interface with the computer processor to receive the requests for data and to control the FIFO buffer for providing the requested data for use by the processor.

6. The interface circuit of claim 1, wherein the interface controller is configured to interface with a peripheral device via the peripheral interface bus to receive requests for data from a bus master and to control the peripheral device and FIFO buffer to provide the requested data to the bus master.

7. The interface circuit of claim 1, wherein the interface controller is configured to identify a type of the flash memory circuit and to communicate with the flash memory circuit using a command set and communications protocol for the identified type.

8. A flash memory-interface system for storing and providing access to data mapped as a portion of main memory of a computer, the system comprising:

a peripheral interface bus;

a flash memory circuit configured to connect to and communicate via the peripheral interface bus and to provide the data in the flash memory mapped as a portion of main memory;

a first in, first out FIFO buffer coupled to receive and store data from the flash memory circuit and to provide access to the stored data; and an interface circuit configured to communicate with the flash memory circuit via the peripheral interface bus, initialize the flash memory circuit for providing data to the FIFO buffer as a portion of the main memory, in response to a request for data starting at an address in said portion of main memory and having at least a portion thereof stored in the FIFO buffer, control the FIFO buffer to provide access to the stored data and control the flash memory circuit to provide additional data from subsequent addresses in the flash memory circuit to the FIFO buffer, and in response to a request for data starting at an address in a portion of main memory and not stored in the FIFO buffer, control the flash memory circuit and FIFO to provide the requested data to the FIFO buffer and, thereafter, to provide additional data from subsequent addresses in the flash memory circuit to the FIFO buffer.

9. The system of claim 8, wherein the interface circuit is configured to communicate with the flash memory circuit to retrieve identification information from the flash memory circuit, and in response to the retrieved identification information, set and use a command set for communicating with, initializing, and controlling the flash memory circuit.

10. The system of claim 8, wherein the interface circuit is configured to, in response to the request for the data starting at an address in a portion of main memory and having at least a portion thereof stored in the FIFO buffer, control the flash memory and the FIFO buffer to provide access to any previously unread portion from subsequent addresses in the flash memory circuit to the FIFO buffer, followed by reading and storing data from subsequent addresses in the flash memory circuit in the FIFO buffer.

11. The system of claim 8, wherein the interface circuit is configured to, in response to the request for data starting at an address in a portion of main memory that is not stored in the FIFO buffer, provide access to the requested data, and thereafter, control the flash memory and the FIFO buffer to read and store data from subsequent addresses in the flash memory circuit in the FIFO buffer.

12. The system of claim 8, wherein the interface circuit is configured to operate the flash memory circuit in a programming mode to store data on the flash memory circuit.

13. The system of claim 8, wherein the interface circuit is configured to send a programming command over the peripheral interface bus to the flash memory circuit to operate the flash memory circuit in a programming mode, and after said programming command is completed, send a status-polling command to the flash memory to detect completion of the resulting flash programming operation.

14. The system of claim 8, wherein the interface circuit is configured to operate the flash memory circuit in an erase mode to erase data on the flash memory and to operate the flash memory circuit in a programming mode to store data on the flash memory circuit, after the data on the flash memory is erased.

15. The system of claim 8, wherein the interface circuit is configured to operate the flash memory circuit in a read-only memory mode to provide read-only access to data stored in the flash memory circuit as a part of the main memory space of an associated processor.

16. The system of claim 8, wherein the interface circuit is configured to provide a clock signal to the flash memory circuit for reading data out from the flash memory circuit to the FIFO buffer, and to cease switching said clock in response to the FIFO buffer being filled.

17. The system of claim 8, wherein the interface circuit is configured to provide a chip select signal to the flash memory circuit for reading data out from the flash memory circuit to the FIFO buffer, and to de-assert the chip select signal when the controlling bus master has not accessed any data from the flash memory for a programmed time period.

18. A method for interfacing between a computer processor and a flash memory circuit communicatively connected to an interface circuit by a peripheral interface bus, for storing and providing access to data that is stored on the flash memory circuit and mapped as a portion of main processor memory, the method comprising:

initializing the flash memory circuit, via the peripheral interface bus, for providing data to a first-in, first-out (FIFO) buffer coupled to receive and store data from the flash memory circuit and to provide read access to the stored data as a portion of the main memory;

in response to a request for data mapped in said portion of main memory and having at least a portion thereof stored in the FIFO buffer, controlling the FIFO buffer to provide access to the stored data and controlling the flash memory circuit via the peripheral interface bus to provide additional data from sequential addresses in the flash memory circuit to the FIFO buffer; and in response to a request for the data mapped as a portion of main memory that is not stored in the FIFO buffer, controlling the flash memory circuit via the peripheral interface bus to provide the requested data to the FIFO buffer.

19. The method of claim 18, further including communicating with the flash memory circuit via the peripheral interface bus to retrieve identification information from the flash memory circuit, and in response to the retrieved identification information, set and use a command set for initializing, communicating with and controlling the flash memory circuit via the peripheral interface bus.

* * * * *